(12) United States Patent
Bohne et al.

(10) Patent No.: US 7,908,951 B2
(45) Date of Patent: Mar. 22, 2011

(54) ADJUSTABLE CHIP GUIDE FOR REMOVING PART OF THE CHIPS OF A MACHINE TOOL

(75) Inventors: Ulrich Bohne, Kohlberg (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 880 days.

(21) Appl. No.: 10/500,483

(22) PCT Filed: Mar. 3, 2003

(86) PCT No.: PCT/DE03/00691
§ 371 (c)(1),
(2), (4) Date: Jun. 29, 2004

(87) PCT Pub. No.: WO03/103883
PCT Pub. Date: Dec. 18, 2003

(65) Prior Publication Data
US 2005/0103172 A1    May 19, 2005

(30) Foreign Application Priority Data
Jun. 5, 2002 (DE) .................................. 102 24 837

(51) Int. Cl.
*B26D 7/00* (2006.01)
(52) U.S. Cl. ............................ 83/100; 83/478; 83/581
(58) Field of Classification Search ............ 30/124, 30/125, 388, 390, 391; 451/456, 451; 83/98, 83/100, 478, 473, 581; 408/67; 144/252.1, 144/252.2; 409/137
See application file for complete search history.

(56) References Cited

U.S. PATENT DOCUMENTS

| | | | | |
|---|---|---|---|---|
| 3,565,464 A * | 2/1971 | Wolf | ................ | 285/7 |
| 3,882,598 A * | 5/1975 | Earle et al. | ................ | 30/390 |
| 4,131,143 A * | 12/1978 | Mayo | ................ | 144/30 |
| 4,201,256 A | 5/1980 | Truhan | | |
| 4,253,362 A * | 3/1981 | Olson | ................ | 83/100 |
| 5,319,888 A | 6/1994 | Heckmiller et al. | | |
| 5,327,649 A * | 7/1994 | Skinner | ................ | 30/124 |
| 5,445,056 A | 8/1995 | Folci | | |
| 5,774,992 A * | 7/1998 | Lindenmuth | ................ | 30/124 |
| 5,927,171 A | 7/1999 | Satou et al. | | |
| 6,094,827 A * | 8/2000 | Campbell | ................ | 30/390 |
| 6,108,912 A | 8/2000 | Radigan | | |
| 6,167,626 B1 * | 1/2001 | Doumani et al. | ................ | 30/124 |
| 6,219,922 B1 * | 4/2001 | Campbell et al. | ................ | 30/124 |
| 6,502,316 B2 * | 1/2003 | Campbell et al. | ................ | 30/390 |
| D525,503 S * | 7/2006 | Waldron | ................ | D8/66 |
| 7,526,866 B2 * | 5/2009 | Schnell et al. | ................ | 30/124 |

FOREIGN PATENT DOCUMENTS

DE    7221303    8/1972

(Continued)

*Primary Examiner* — Boyer D. Ashley
*Assistant Examiner* — Omar Flores-Sánchez
(74) *Attorney, Agent, or Firm* — Michael J. Striker (57) ABSTRACT

A machine tool, in particular a circular power saw, for machining a workpiece, has a covering (10) for guarding a user against machining residues of the workpiece that occur in operation and an adjustable residue guide (12, 14) for carrying away at least some of the machining residues through an outlet opening in a defined direction in accordance with the position of the residue guide (12, 14). The residue guide is adjustable in such a way that in one position of the residue guide (12, 14), at least some of the machining residues are carried onward inside the covering (10).

17 Claims, 5 Drawing Sheets

FOREIGN PATENT DOCUMENTS

| | | |
|---|---|---|
| DE | 38 43 912 A | 6/1990 |
| DE | 3843912 A1 * | 6/1990 |
| EP | 0 775 548 A | 5/1997 |
| JP | 8-118309 | 5/1996 |

* cited by examiner

ADJUSTABLE CHIP GUIDE FOR REMOVING PART OF THE CHIPS OF A MACHINE TOOL

CROSS-REFERENCE

The invention described and claimed hereinbelow is also described in PCT/DE 03/00691, filed Mar. 3, 2003 and DE 102 24 837.0, filed Jun. 5, 2002. This German Patent Application, whose subject matter is incorporated here by reference, provides the basis for a claim of priority of invention under 35 U.S.C. 119 (a)-(d).

BACKGROUND OF THE INVENTION

The invention is based on a machine tool.

In most known circular power saws, the user is protected against the chips, or sawdust, created during sawing by means of a covering in the form of a guard hood. The chips are carried to the outside through a lateral outlet opening, and the outlet opening usually has a standard stub to which a vacuum cleaner or dust bag can be attached. Often, however, for reasons of convenience, circular power saws of this kind are used without a vacuum cleaner or dust bag, and the sawdust created during sawing then passes unhindered out of the outlet opening. However, this impedes the operation of the circular power saw, since the emerging sawdust could strike the user directly on his body.

For carrying the chips away, it is therefore known to use a rotatable elbow, so that the direction in which the chips are carried away can be varied by rotating the elbow. The user can then rotate the elbow in such a way that he is not struck by the emerging chips.

SUMMARY OF THE INVENTION

The invention includes the general technical teaching, for carrying away machining residues in a machine tool, of providing an adjustable residue guide; in one position, the residue guide carries at least some of the machining residues onward inside the covering.

The term "machining residues" used within the context of the invention should be understood in a general sense and includes not only the chips, or sawdust, already mentioned at the outset but abrasion from grinding, for instance, or residues from additive substances.

In a variant of the invention, the residue guide has a pivot tube, which is pivotable about a pivot axis that preferably extends perpendicular to the longitudinal axis of the pivot tube. In one pivoted position of the pivot tube, the pivot tube preferably discharges inside the covering, while conversely in another pivoted position, the pivot tube discharges outside the covering. Depending on the pivoted position of the pivot tube, the machining residues are accordingly either carried to the outside by the pivot tube or carried onward inside the covering.

In another variant of the invention, conversely, the residue guide has a pivot tube which is rotatable about an axis of rotation. Preferably, the axis of rotation is at an angle here to the longitudinal axis of the pivot tube, and angles between 10° and 50° are advantageous.

For delivering the machining residues, a feed tube is preferably provided, which discharges into the pivot tube and preferably has the same diameter as the pivot tube.

The axis of rotation is preferably also angled relative to the longitudinal axis of the feed tube; the longitudinal axes of the feed tube on the one hand and the pivot tube on the other preferably form the same angle with the axis of rotation. An advantageous aspect of this is that the pivot tube, in one rotated position, extends precisely parallel to the feed tube, since the angles of inclination of the feed tube and the pivot tube cancel one another out.

Moreover, in this respect it is preferably provided that the axis of rotation intersect the longitudinal axes of the feed tube and of the pivot tube at a common intersecting point. This offers the advantage that in a rotated position the pivot tube does not extend merely parallel to the feed tube but is instead aligned with it.

Preferably, the outer contours of the feed tube and of the pivot tube are circular at the abutting point; the feed tube and the pivot tube preferably have the same outer diameter at the abutting point. This offers the advantage that upon rotation of the pivot tube, no discontinuities occur at the abutting point.

It is especially advantageous if the outer contour of the pivot tube and the outer contour of the feed tube at the abutting point between the pivot tube and the feed tube are each formed spherically with the same outer diameter, so that the abutting point is embodied spherically. Because of this spherical shape, the rotation function of the abutting point is made clear to the user. The outer diameter of the spherically connection pieces of the feed tube and of the pivot tube is preferably greater than the normal outer diameter of the feed tube and of the pivot tube, so that the spherical shape is visually emphasized.

In a further variant of the invention, the residue guide conversely has a preferably drum-shaped rotary slide, which is rotatable about a predetermined axis of rotation. As a function of its rotary position, the rotary slide carries the machining residues onward inside the covering or discharges them to the outside through an outlet opening.

In a preferred embodiment, the rotary slide has an integrated guide tube, which rotates with the rotary slide. The guide tube can then discharge the machining residues in different directions, as a function of the rotary position of the rotary slide.

To make manual rotation of the rotary slide easier, various operator control elements are provided, such as grip indentations, a knurled structure on the surface, or a lever.

In the preferred embodiment, the residue guide has a connection stub, to which a dust bag or a vacuum cleaner can be connected. The fixation of the dust bag or of the vacuum cleaner hose to the connection stub can be done by means of a clamp connection, for instance, by slipping a connection piece of the dust bag or of the vacuum cleaner hose on in clamping fashion.

Preferably, the connection stub therefore has a conical shape, to improve the clamping action. In a variant, the connection stub has an outer shape which tapers conically toward the distal end of the connection stub, so that the corresponding connection piece of the dust bag or of the vacuum cleaner hose will clamp to an increasing extent on being slipped on. In another variant, conversely, the connection stub has an internal shape which widens conically toward the distal end of the connection stub, so that the connection piece of the dust bag or of the vacuum cleaner hose clamps to an increasing extent on being inserted inside.

Preferably, the residue guide is shaped and adjustable in such a way that the residue guide, in one position, has a common outer contour with the covering.

In all the embodiments described above, the adjustment of the residue guide can be done continuously or in stages.

In the event of adjustment of the residue guide in stages, detent means may be provided, so that the residue guide snaps into place in one or more detent positions. Preferably, such detent means make at least two different detent positions possible, and the residue guide carries the machining residues onward inside the covering in one detent position, while in the other detent position the machining residues are carried away to the outside. In the preferred embodiment, however, a plurality of detent positions are provided, so that the user can adjust the residue guide in such a way that the machining residues produced in operation will be carried away in the desired direction.

A spring element may also be provided, which puts the residue guide into a position in which the machining residues are carried away inside the covering. After a dust bag or a vacuum cleaner hose has been removed, the spring element then automatically assures that the machining residues produced in operation will be carried onward inside the covering, so as not to impede operation.

Further advantages will become apparent from the ensuing description of the drawings. In the drawings, one exemplary embodiment of the invention is shown. The drawings, description and claims include numerous characteristics in combination. One skilled in the art will expediently consider the characteristics individually as well and put them together to make useful further combinations.

BRIEF DESCRIPTION OF THE DRAWINGS

FIG. 3c, a side view of the circular power saw of FIG. 3a;

DESCRIPTION OF THE PREFERRED EMBODIMENTS

Figure 1:
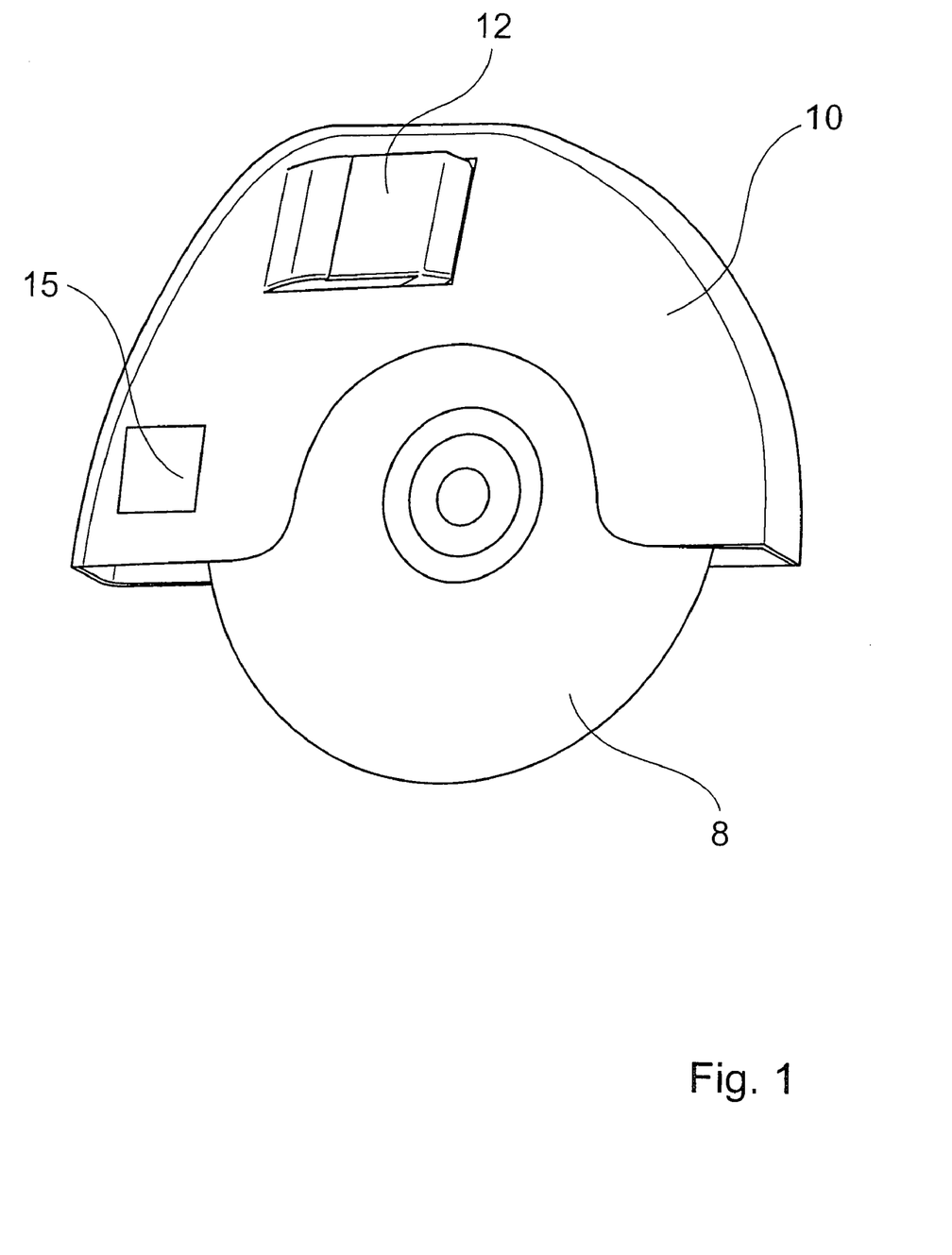
FIG. 1, a circular power saw of the invention, with a pivot tube folded inward for carrying away chips, or sawdust.
Figure 1A:
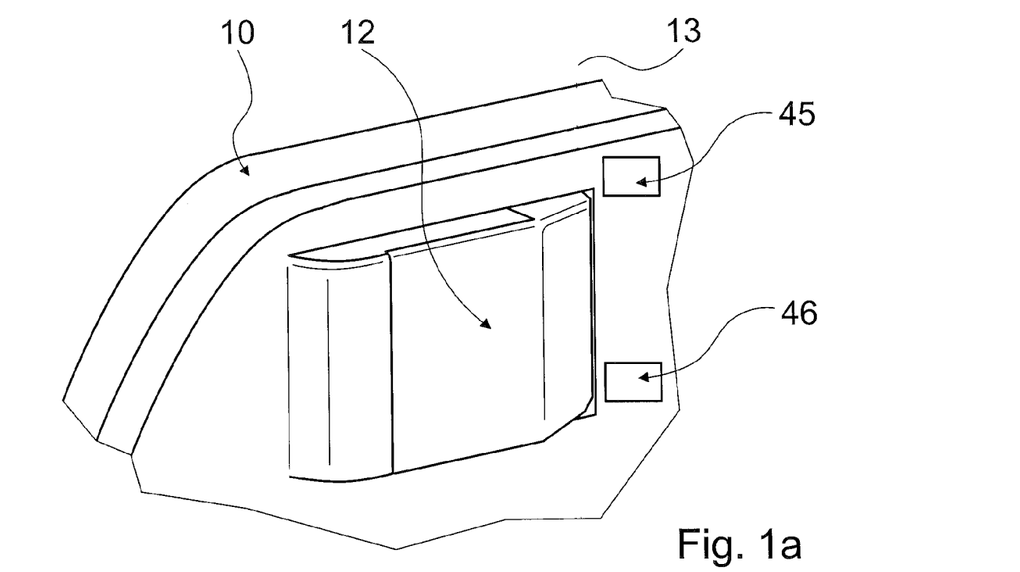
FIG. 1a, a perspective view of a detail of the pivot tube of FIG. 1 in the folded-together state.
Figure 1B:
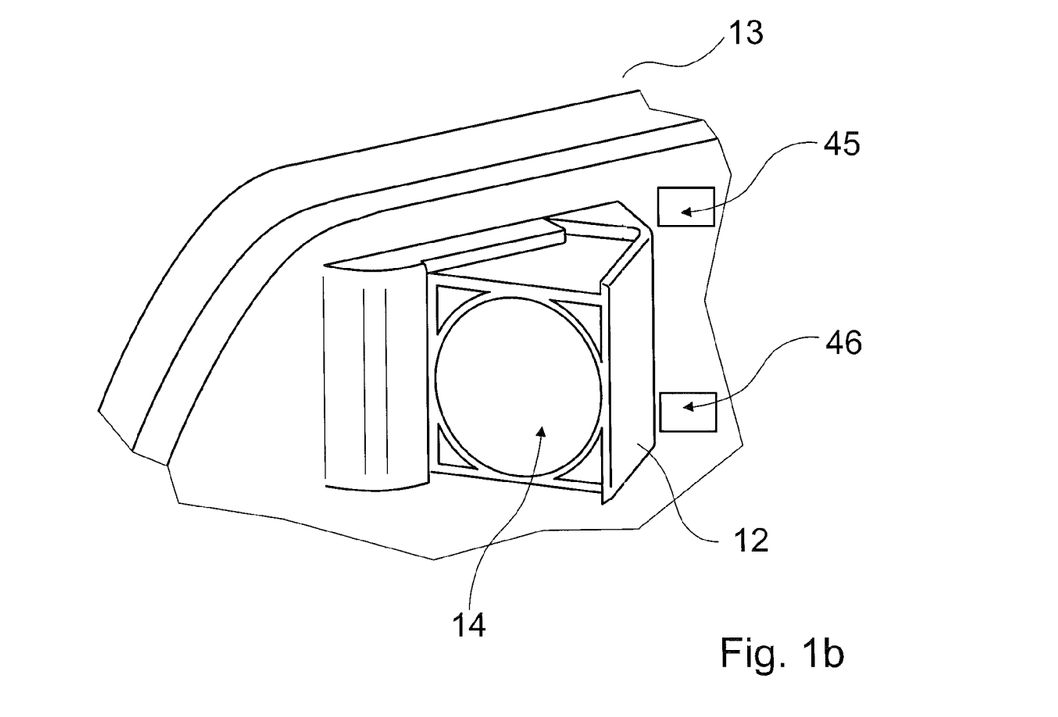
FIG. 1b, a perspective view of a detail of the pivot tube of FIG. 1 in the folded-out state.

The circular power saw shown in perspective in FIGS. 1 through 1b is largely embodied conventionally and has an electric motor which drives a saw blade 8.

The saw blade 8 is covered here by a covering 10 in the form of a guard hood, for protecting the user against sawdust produced in sawing operation and to prevent injury from the saw blade 8.

A flap 12 with an integrated pivot tube 14 is disposed on the side of the covering 10; the flap 12 can be pivoted about a pivot axis 13 which extends parallel to the plane of the saw blade 8.

In the state of the circular power saw shown in FIGS. 1a and 1b, the flap 12 is folded inward, so that the sawdust created during operation is guided to the rear (to the left in the drawing) inside the covering 10, where it is carried away either through a lateral outlet opening 15 located on the lower end of the covering 10 or directly downward out of the covering 10.

In contrast to this, in the state shown in FIG. 1b, the flap 12 is folded out, so that the discharge opening of the pivot tube 14 is uncovered. The sawdust produced in operation of the circular power saw is therefore carried away laterally by the pivot tube 14.

For receiving the sawdust emerging from the pivot tube 14, a dust bag or a vacuum cleaner hose can be connected to the pivot tube 14. The pivot tube 14, in the region of its outer discharge opening, therefore forms a connection stub 44 for a dust bag or a vacuum cleaner hose; the connection stub 44 is shaped conically, so that by means of a clamping action, a firm seat of the dust bag or of the vacuum cleaner hose on the connection stub 44 will be attained. The inside diameter of the pivot tube 14 accordingly tapers inward conically, by the same conical angle at which the connection stubs of corresponding conventional dust bags and vacuum cleaner hoses taper, as a result of which a good clamping fit is attained.

The flap mechanism moreover has a spring element 46, which automatically fold the flap 12 inward along with the pivot tube 14 whenever no dust bag or vacuum cleaner hose is connected.

However, it is alternatively also possible for the flap mechanism to have detent elements 45, which lock the flap 12 in either the folded-in or the folded-out state. This advantageously makes it possible, even without a dust bag or a vacuum cleaner hose, to operate the circulate power saw with the pivot tube 14 folded out, so that the sawdust produced in operation can be carried away laterally.

It should also be noted that the flap 12 completely seals off the covering 10 laterally in the closed state, so that no sawdust can escape laterally. The contours of the covering 10 and flap 12 are moreover adapted to one another in such a way that only minimal gaps occur between the covering 10 and the flap 12, so that in the folded-out state, the sawdust escapes solely through the pivot tube 14, while secondary streams are conversely avoided.

Figure 2A:
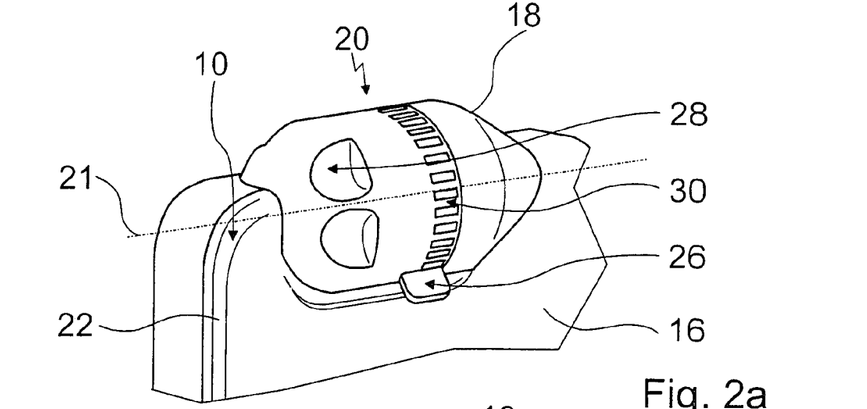
FIG. 2a, an alternative exemplary embodiment of a circular power saw of the invention, with a drumlike rotary slide for carrying away sawdust produced in sawing, the rotary slide being closed.
Figure 2B:
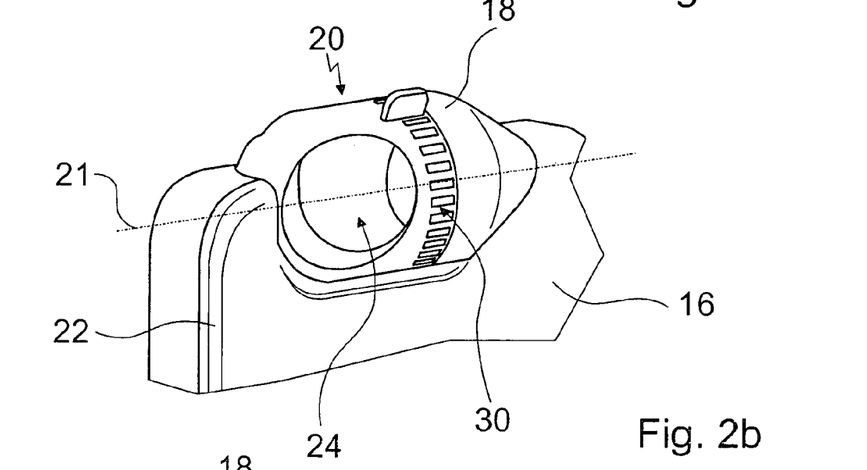
FIG. 2b, the circular power saw of FIG. 2a, with a rotary slide open at the side.
Figure 2C:
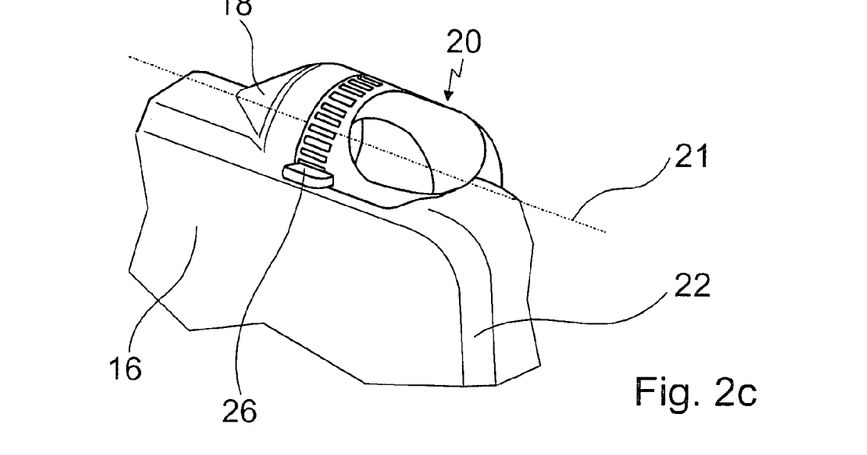
FIG. 2c, the circular power saw of FIG. 2a, with a rotary slide open at the top.

The exemplary embodiment of a circular power saw of the invention shown in FIGS. 2a through 2c largely matches the exemplary embodiment described above, so that in part the above description can be referred to. Here only a fragmentary perspective view is shown, representing the mechanism of the invention.

This circular power saw likewise has a saw blade standing upright, which is driven in a conventional way by an electric motor and is enclosed by a covering 10', to protect the user against sawdust produced in operation and to prevent injury from the saw blade.

During operation of the circular power saw, the sawdust is blown upward inside the covering 10 in a front region 16, where it reaches a feed tube 18, which widens conically in the flow direction and finally changes over into a cylindrical region. The feed tube 18 is open at the bottom here and discharges into a drumlike rotary slide 20, which is rotatable about an axis of rotation 21 and which either carries the sawdust outward or onward into a rear region 22 of the covering 10', depending on its rotary position. The cross-sectional shape of the feed tube 18 should be optimized for the flow and need not necessarily have a conical shape.

In the position of the rotary slide 20 shown in FIG. 2a, the sawdust is not carried away to the outside by the rotary slide 20 but instead is carried onward inside the covering 10' into its rear region 22, where it finally escapes through an outlet opening on the underside of the covering 10'. To that end, the rotary slide 20 has an integrated guide tube 24, which rotates with the rotary slide 20 and carries the sawdust away in a defined direction, as a function of the rotary position of the rotary slide 20. In the position of the rotary slide 20 shown in FIG. 2a, the guide tube 24 directs the sawdust, arriving from the feed tube 18, obliquely downward into the covering 10', where it finally escapes through the outlet opening disposed on the underside of the covering 10'. The covering 10' is therefore shaped such that the discharge opening of the guide tube 24, in the position of the rotary slide 20 as shown in FIG. 2a, is located entirely inside the covering 10'. The covering 10' therefore extends along the underside of the rotary slide 20 in the lateral direction over an angular range that is larger than the opening angle of the discharge opening of the guide tube 24, so that the discharge opening can be surrounded completely.

In contrast to this, in the position of the rotary slide 20 shown in FIG. 2b, the sawdust is carried away to the outside laterally, since in this position the guide tube 24 is rotated to the side, so that the discharge opening of the guide tube 24 is uncovered.

Finally, in the position of the rotary slide 20 shown in FIG. 2c, the sawdust is carried away obliquely upward by the guide tube 24.

Accordingly, the user can adjust the rotary slide 20 in such a way that the emerging sawdust is as slight a hindrance as possible. To that end, a handle 26 which makes manual rotation of the rotary slide 20 easier is integrally formed onto the outside of the rotary slide 20. The same purpose is served by grip indentations 28 and a knurled structure 30, which are integrally formed onto the rotary slide 20.

The rotatable support of the drumlike rotary slide 20 is accomplished at guide diameters that are received in the covering 10' by suitably integrally formed bearing shells.

Detent elements are also provided, which make it possible to lock the rotary slide 20 in various rotary positions.

Moreover, the guide tube 24 integrated with the rotary slide 20 forms a connection stub 44, to which a dust bag or a vacuum cleaner hose can be attached. The guide tube 24 therefore widens conically toward its discharge opening, in order to attain a clamping fit of the dust bag or vacuum cleaner hose on the connection stub 44.

Figure 3A:
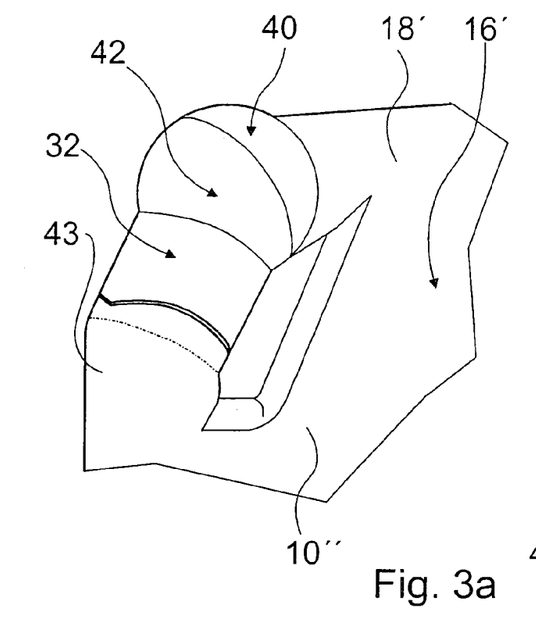
FIG. 3a, an alternative exemplary embodiment of a circular power saw of the invention, with a pivot tube in the closed state.
Figures 3B, 3D:
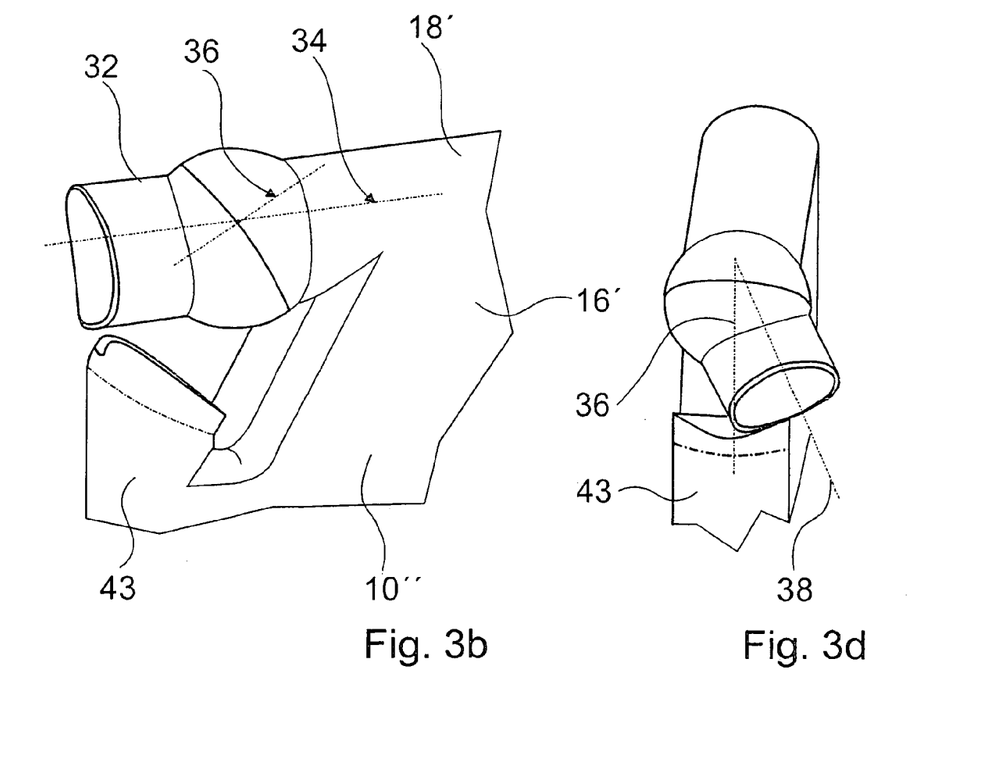
FIG. 3b, the circular power saw of FIG. 3a, with a pivot tube open at the back.
FIG. 3d, the circular power saw of FIG. 3a, with the pivot tube folded obliquely outward.
Figure 3C:
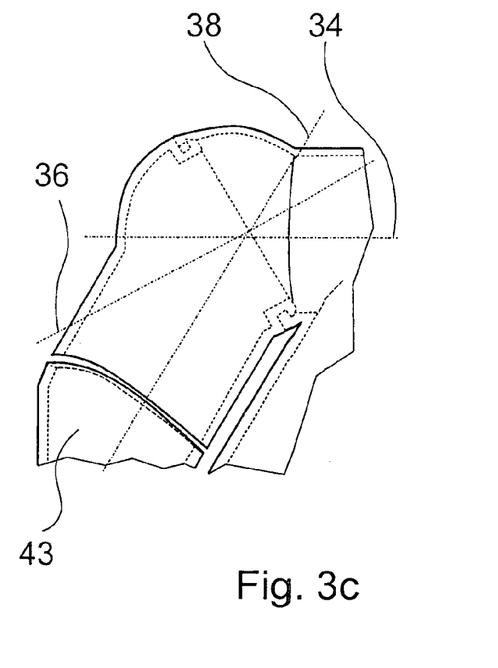
Figure 4A:
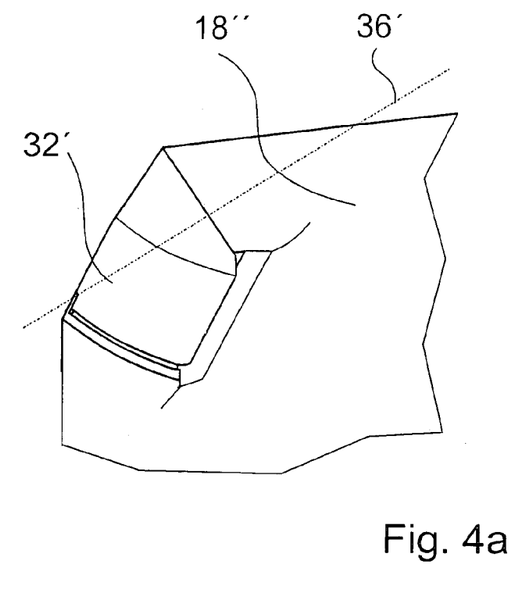
FIGS. 4a-4d, an alternative exemplary embodiment of a circular power saw of the invention.
Figure 4B:
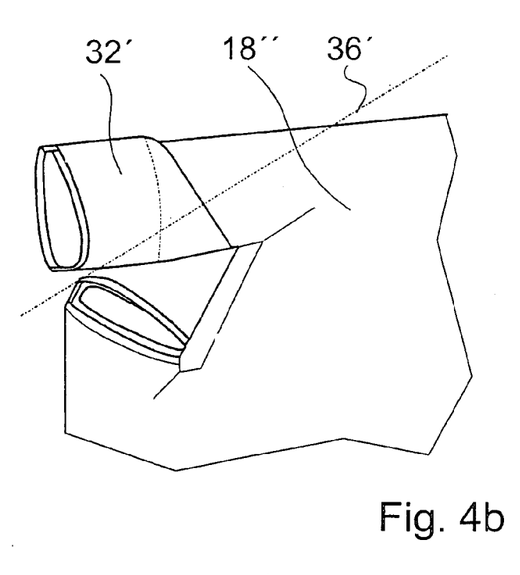
Figure 4C:
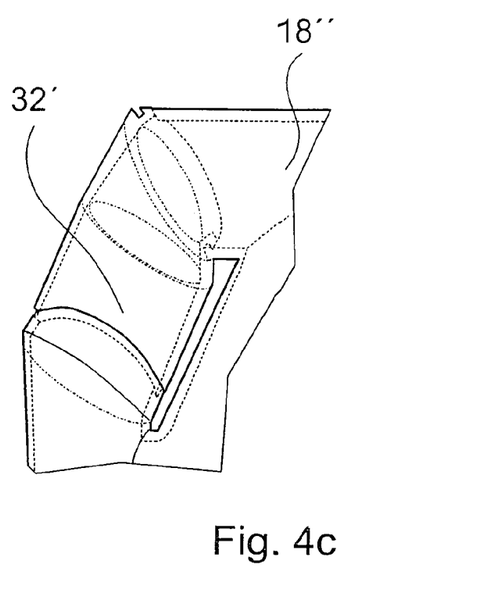
Figure 4D:
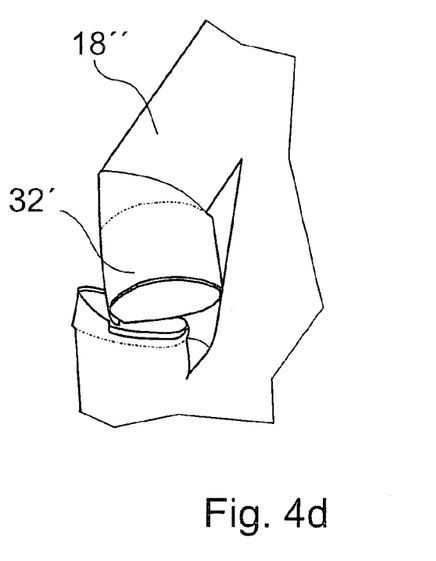

The exemplary embodiment of a circular power saw of the invention shown in FIGS. 3a through 3c likewise largely agrees with the exemplary embodiments described above, so that the above description can be referred to for further information. In this exemplary embodiment as well, only a fragmentary perspective view is shown, illustrating the mechanism of the invention.

The sawdust that occurs in operation of the circular power saw is initially blown upward here in a front region 16' of a covering 10'', where it reaches a largely cylindrical feed tube 18', which discharges into a pivot tube 32 and has a substantially horizontally extending longitudinal axis 34.

The pivot tube 32 here is pivotable about a predetermined axis of rotation 36; the pivot tube 32 has a longitudinal axis 38 which forms the same angle with the axis of rotation 36 as does the longitudinal axis 34 of the feed tube 18'. This geometric arrangement makes it possible for the pivot tube 32, in the rotary position shown in FIG. 3b, to be aligned with the feed tube 18', so that the sawdust emerges from the pivot tube 32 without being detoured.

In the rotary position of the pivot tube 32 shown in FIG. 3d, the sawdust is conversely discharged obliquely to the side.

At the abutting point between the pivot tube 32 and the feed tube 18', the feed tube 18' and the pivot tube 32 have spherically shaped connection pieces 40 and 42, respectively; the connection pieces 40, 42 have the same outer diameter.

This offers the advantage first that the outer contours of the feed tube 18' and of the pivot tube 32 merge with one another without discontinuities, which contributes to a visually attractive overall impression.

Second, in this way, discontinuities of contour at the abutting point are avoided even upon a rotation of the pivot tube 32.

Finally, the spherical thickening at the abutting point between the feed tube 18' and the pivot tube 32 clearly shows the rotary function of the pivot tube 32, which is thus self-explanatory.

In the position of the pivot tube 32 shown in FIGS. 3a and 3c, the pivot tube 32 conversely discharges into a connection tube 43 in the covering 10'', so that the sawdust is carried onward inside the covering 10'' and finally escapes through an outlet opening on the underside of the covering 10''.

The exemplary embodiment of a circular power saw of the invention shown in FIGS. 4a through 4d largely matches the exemplary embodiment described above and shown in FIGS. 3a through 3d, so that below, the same reference numerals are used for components that correspond to one another, and to avoid repetition, reference is made to the description above.

The special feature of this exemplary embodiment is that the feed tube 18'' and the pivot tube 32' have no spherical thickening at the abutting point, so that a different visual impression is given.

The invention is not limited to the preferred exemplary embodiments described above. On the contrary, many variants and modifications are possible that likewise make use of the concept of the invention and are therefore within the scope of the invention.

LIST OF REFERENCE NUMERALS

8 Saw blade
10, 10', 10'' Covering
12 Flap
13 Pivot axis
14 Pivot tube
15 Outlet opening
16, 16' Front region of the covering
18, 18', 18'' Feed tube
20 Rotary slide
21 Axis of rotation
22 Rear region of the covering
24 Guide tube
26 Handle
28 Grip indentations
30 Knurled structure
32, 32' Pivot tube
34 Longitudinal axis of the feed tube
36, 36' Axis of rotation of the pivot tube
38 Longitudinal axis of the pivot tube
40 Connection piece of the feed tube
42 Connection piece of the pivot tube
43 Connection tube

The invention claimed is:

1. A machine tool for machining a workpiece by a tool, comprising:
 a covering for guarding a user against machining residues of the workpiece that occur in operation and for preventing injury from the tool; and
 an adjustable residue guide, wherein the adjustable residue guide has a rotary slide, which is rotatable about an axis of rotation, and a guide tube which is integrated in the rotary slide, wherein the rotary slide rotates with the guide tube, so that in one position of the rotary slide, the guide tube carries machining residues inside the covering, while in another position of the rotary slide, the guide tube carries the machining residue outside of the covering.

2. The machine tool of claim 1, wherein for delivering the machining residues a feed tube is provided, which discharges at least some of the machining residues into the guide tube, and the guide tube is pivotable relative to the feed tube.

3. The machine tool of claim 1, wherein the adjustable residue guide has a connection stub for an external extraction of residues by suction or for a receiving container.

4. The machine tool of claim 1, wherein the adjustable residue guide is adjustable continuously or in stages.

5. An apparatus, having a covering and an adjustable residue guide for a machine tool of claim 1.

6. The machine tool of claim 1, wherein the adjustable residue guide is disposed at a top of the covering.

7. The machine tool of claim 6, wherein the guide tube has a rotary position, in which residues created during operation are carried onward inside the covering from the top of the covering in a direction downward.

8. The machine tool of claim 1, being designed to rotatably drive a tool about a rotation axis, whereby residues produced in operation are carried away by the guide tube in a direction having a component along the rotation axis.

9. The machine tool of claim 1, comprising a feed tube that discharges at least some of the machining residues into the guide tube.

10. The machine tool of claim 9, wherein the feed tube has a longitudinal axis that is disposed substantially horizontally.

11. The machine tool of claim 1, wherein the rotary slide has a first rotary position, in which the rotary slide carries the machining residues onward inside the covering, and a second rotary position, in which the rotary slide discharges the machining residues to the outside through an outlet opening.

12. The machine tool of claim 1, wherein the guide tube has a discharge opening and the rotary slide has a position, in which the discharge opening is located entirely inside the covering.

13. The machine tool of claim 1, consisting of a circular power saw.

14. The machine tool of claim 1, wherein the rotary slide rotates about an axis which extends parallel to the plane of the saw blade.

15. The machine tool of claim 1, wherein the covering is formed as a guard hood which covers the tool.

16. The machine tool of claim 1, wherein the rotary slide has at least a first and a second position, such that in the first position the machining residues are carried outwardly through the guide tube laterally of the covering and in the second position the machining residues are carried outwardly obliquely to the covering.

17. The machine tool of claim 1, wherein the rotary slide comprises a handle, for facilitating a manual rotation of the rotary slide.

* * * * *